Oct. 28, 1952 R. L. JAESCHKE 2,616,069
DYNAMOELECTRIC MACHINE
Filed March 19, 1951
FIG. 1.
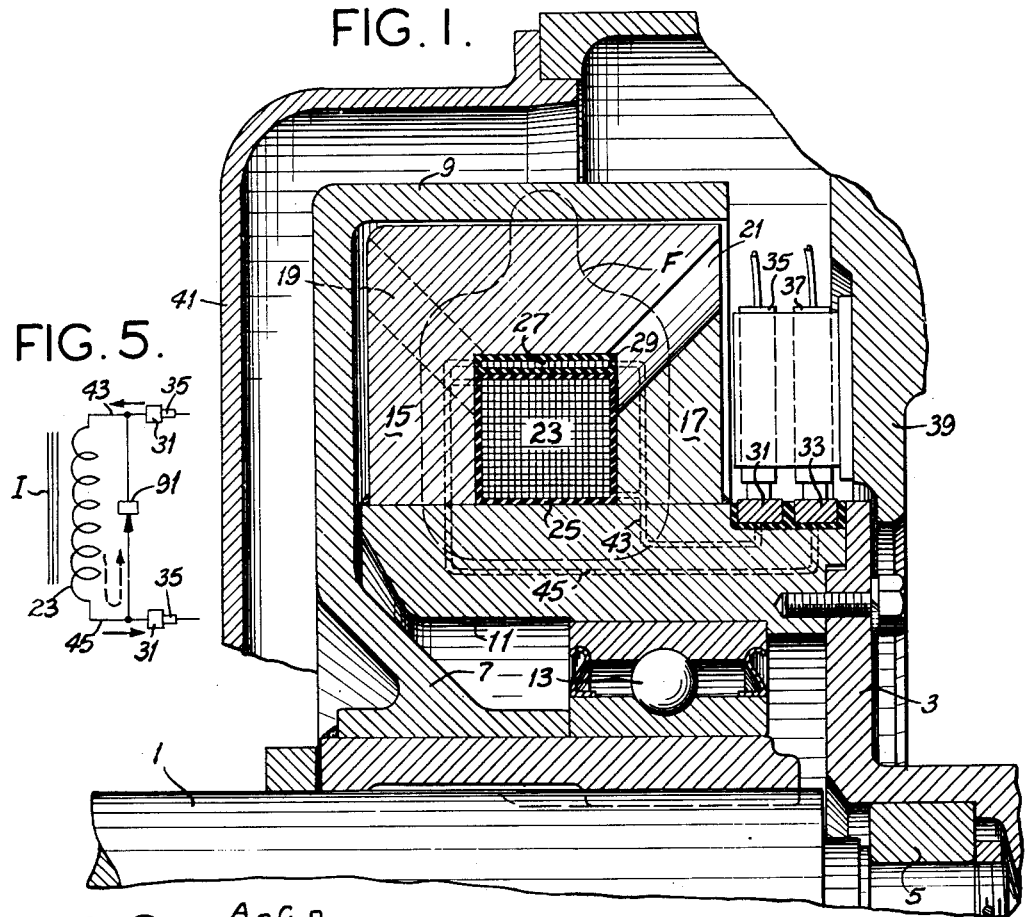
FIG. 5.
FIG. 2.
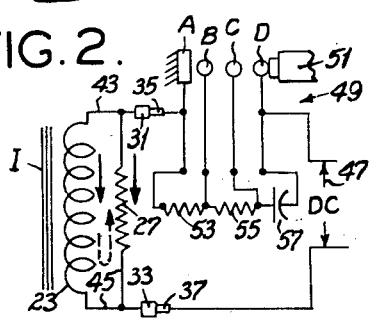
FIG. 3.
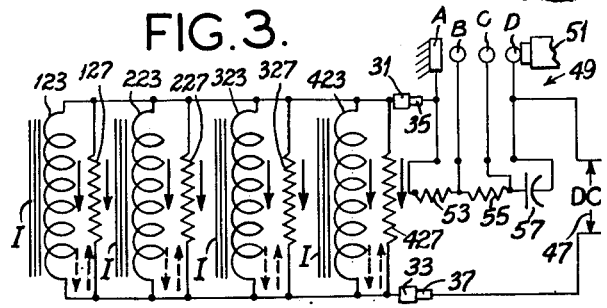
FIG. 4.
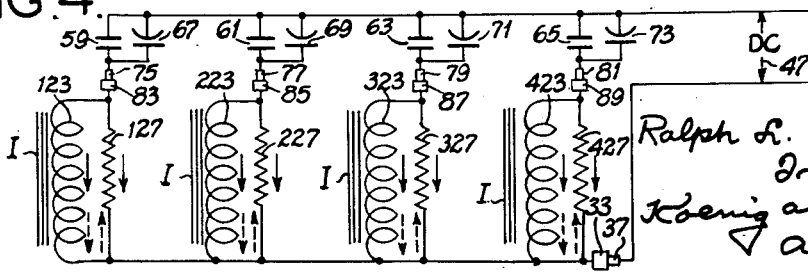
Ralph L. Jaeschke,
Inventor.
Koenig and Pope,
Attorneys.

Patented Oct. 28, 1952

2,616,069

UNITED STATES PATENT OFFICE 2,616,069

DYNAMOELECTRIC MACHINE

Ralph L. Jaeschke, Kenosha, Wis., assignor to Dynamatic Corporation, Kenosha, Wis., a corporation of Delaware Application March 19, 1951, Serial No. 216,377

12 Claims. (Cl. 318—492)

This invention relates to dynamoelectric machines, and more particularly to such apparatus employing one or more rotary field coils supplied with direct current through slip rings and brushes.

The conductive coils of many dynamoelectric machines are constructed with a substantial number of ampere turns (high inductance) and are located on a rotary part of the machine and must therefore be fed their D. C. exciting currents through brushes and slip rings. Such coils, in common with all conductive coils having a high inductance, produce high inverse voltages and large follow-up currents upon interruption of the direct current. This phenomenon is caused when the circuit is suddenly opened by the collapse at a high rate of magnetic flux linking the coil. The result may be heavy arcing at the switch contacts or breakdown of the coil insulation. It should be noted that inadvertent opening of the circuit may occur at the slip rings and their brushes, particularly if the rings have high-resistance contact due to wear or the existence of oil or like insulating films. A general object of the present invention is to provide compact, simple, and trouble-proof means in apparatus of the class described for preventing the adverse effects above-mentioned.

Heretofore it has been known to provide inverse voltage protection for highly inductive coils in general by placing a resistor in parallel with the inductance, but such resistances have been disadvantageously formed, and in the case of rotary machines, disadvantageously placed on the stationary side of the slip rings. It is another object of the invention so to form and place such resistances in apparatus of the class described that they will give protection to the coil itself against opening of the switch or opening of the circuit at the brushes, add to the magnetomotive force of the protected coil and also dissipate heat effectively. In addition, the resistances are given a compact form which is best suited to accurate balance at high operating speeds.

Broadly speaking, the invention consists in connecting an impedance in parallel with the field coil to form a loop, this loop being located in the part of the electric excitation network that is physically rotating, i. e., on the rotor carrying the exciting coil to be protected. More specifically, the impedance is in the form of resistance wire wound with the rotary exciting coil in a direction to augment its ampere turns for excitation and in a position for maximum heat dissipation, i. e., on the outside of the exciting coil. The result is a low-cost, reliable and efficient construction. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is an axial section showing a physical embodiment of one form of the invention;

Fig. 2 is a circuit diagram for the form of the invention shown in Fig. 1;

Fig. 3 is a circuit diagram showing a first alternative;

Fig. 4 is a circuit diagram showing a second alternative; and,

Fig. 5 is a fragmentary circuit diagram showing an alternative form of a certain series loop circuit.

In all of the figures solid arrows exemplify conditions of steady current flow, and the dotted arrows transient current flow conditions.

Similar reference characters indicate corresponding parts throughout the several views of the drawings.

Referring now more particularly to Fig. 1, there is shown an exemplary electric slip coupling or clutch embodying the invention, wherein numeral 1 indicates a driving member (shaft) and numeral 3 a driven member. Numeral 5 indicates a pilot bearing between members 1 and 3. The driving and driven relationship between members 1 and 3 may be reversed if desired. Keyed to the shaft 1 is a hub 7 which carries a magnetic (iron for example) inductor drum 9. Bolted to the driven member 3 is a magnetic (iron for example) sleeve or hub 11. Between members 7 and 11 is another pilot bearing 13. Welded to the sleeve 11 are magnetic (iron for example) pole rings 15 and 17 which carry claw-type magnetic (iron for example) pole teeth 19 and 21, respectively. These teeth are spaced and interdigitated across the inner face of the inductor drum 9, thus providing alternate peripheral north and south poles. Further description of these is unnecessary, since they are known per se and may be of any of various forms (see, for example, Patents 2,367,636, 2,465,982, 2,465,983 and 2,470,596). A small air gap exists between the poles and the cylindric inner face of the drum 9.

A space is provided between the sleeve 11, pole rings 15, 17 and poles 19, 21 to accommodate a toroidal field coil 23. It has low-resistance (copper for example) windings insulated from one another by the usual insulation for the purpose, which are located in an insulating cover 25. Wound on the outside of the toroidal coil 23 is another toroidal coil 27. The windings of the coil 27 are wound to carry current in the same clock direction as the current in windings of the coil 23 and preferably consist of a single layer of high-resistance wire (nickel-chrome alloy for example, known as Nichrome). Its windings are insulated from one another, the insulation being of the heat-resistant variety such as spun glass or the like, and are preferably contained in an outer insulating jacket 29.

The specific and total resistance of the wire in coil 23 is lower than the specific and total resistance in the coil 27. At numerals 31 and 33 are shown insulated slip rings mounted on the sleeve 11 and with which cooperate brushes 35 and 37, respectively, mounted on a stationary part 39 of the stationary frame 41. The coils 23 and 27 are connected in parallel across the circuit between the slip rings 31 and 33, as indicated by the connections 43 and 45, respectively. Between themselves the field coil 23 and resistance coil 27 form a series loop. As indicated in Fig. 2, a D. C. circuit 47 is connected across the brushes 35 and 37. One leg of this circuit includes preferably a sequence-contactor switch 49 which has contacts A, B, C, D adapted to be engaged sequentially from right to left by a movable pressure member 51. A resistance 53 is connected across contacts A, B, a resistance 55 is connected across contacts B, C, and a condenser 57 is connected across contacts C, D. The entire circuit may be considered as a network wherein parallel connected coils 23 and 27 themselves form a series loop on the moving side of slip rings 31 and 33.

The character I in Fig. 2 represents the iron of members 11, 15, 17, 19 and 21, the effect of which is to increase the inductance of the coils. The total resistance of coil 27 should be considerably higher than the total resistance of coil 23, for example, about ten times as much. As already stated, the two coils are physically wound in the same direction, preferably in a single toroid with the resistance coil outside. Also, the coil 27 is on the same side of the electrical network relative to the slip rings 31 and 33, as is the coil 23, i. e., in the part of the network that rotates physically. In this rotary part of the network the coils 23 and 27 form the stated series loop.

Operation is as follows, starting with the open-circuit position shown in Fig. 2.

By pushing member 51 to the left, contacts D, C, B, A are consecutively brought together, thus first closing the circuit and then successively shunting out the resistances 55 and 53 until the coil 23 is excited a maximum. Current flows in parallel through the coils 23 and 27. The result is a toroidal flux field such as shown at F in Fig. 1. This flux field is due not only to the coil 23, but in part to the coil 27, which is, as stated wound in the same direction as coil 23. Obviously, excitation may be varied by operating the contact so as to shunt out either resistance 55 or both of the resistances 53 and 55. To open the circuit the member 51 is moved to the right, thus successively inserting resistance 53 and resistance 55, thereby gradually reducing the current in the coil. This gradual reduction of the exciting current alleviates, to some extent, the inverse voltage effect. When the contacts C, D are opened, the field energizing circuit is completely interrupted and the inverse voltage effect becomes substantial.

The effect of the inverse voltage can be understood if the magnetic field is considered to have a certain energy level. If the field energizing network were suddenly opened without the element 27, the inverse voltage would build up, seeking a release for the magnetic field energy, so that an arc might appear at the switch contacts or the coil insulation might break down. In other words, there would be a sudden, damaging release of the magnetic field energy. With the element 27, the energy of the magnetic field is gradually dissipated as heat in the element. The inverse voltage appearing across the coil 23 merely rises to a value which passes the discharge current of coil 23. If the resistance of coil element 27 were equal to that of coil 23, the inverse voltage would be no greater than the field coil exciting voltage. However, such a relation would result in excessive power loss during normal field excitation, hence the resistance of coil 27 is made considerably greater in order to reduce power loss from heating, but not so great as to permit an inverse voltage that would break down the coil insulation.

The capacitor 57 will also absorb some of the energy of the magnetic field. In normal operation three factors contribute to prevent excessive inverse voltage, these factors being the gradual reduction of exciting current produced by the sequence-contactor switch 49, the power absorption of resistance element 27 and the power absorption of the capacitor 57. Under abnormal conditions of operation, some of the above three factors may not be effective. For example, if the switch member 51 is rapidly moved to the right, the current modulating effect is lost. If the energizing network is interrupted at the brushes, then only element 27 is effective. Consequently, the resistance element 27 may be considered as the primary protection against inverse voltage resulting from any cause. Additionally, the element 27 permits simplification of the sequence-contactor switch 49 and a smaller capacitor 57.

The significance of the location of element 27 next to the field coil is apparent. It not only protects against rapid opening of the switch, but also protects against accidental opening of the energizing network at other places, and for that reason is permanently connected to the coil right at the coil terminals. Also, cooling of the resistance is favored by heat radiation, conduction and convection due to windage at the exposed parts between the poles 19 and 21. Finally the arrangement of coil 27 provides a supplemental magnetizing force, although this should not be large because the coil 27 should not itself function as a substantial inductance if it is to prevent high inverse voltages.

In Fig 3 is shown a compound form of the invention in which like numerals designate parts like those in Fig. 1. In this form there are several toroidal field coils 123, 223, 323 and 423, and respective resistance coils 127, 227, 327 and 427, all connected in parallel in the network and respectively paired in series loop relationship on the rotary side of the slip rings 31. All of these coils may be wound in a single toroid with the low-resistance coils 123, 223, 323 and 423 inside, and the high-resistance coils 127, 227, 327 and 427 wound on the outside, all windings being in the same direction. This arrangement has the advantage that the ampere turns required for a given magnetomotive force are distributed between coils 123, 223, 323 and 423. Thus, the necessary applied voltage will be less and also the resulting controlled inverse voltage, which occurs upon change of the applied voltage, without a reduction in the total ampere-turns.

It will be understood that, if desired, each pair of coils 123, 127; 223, 227; 323, 327; and 423, 427 may be wound into a separate toroid, each with its own interdigitated teeth as shown in Fig. 1. Further illustration of such multiplication will not be necessary, since it is known in apparatus of this class to compound toroidal coils and their poles in either axial or coplanar arrangements (see the U. S. patent application of Martin P. Winther, Serial No. 712,521, filed November 27, 1946 for Transmissions, eventuated as Patent 2,548,756). This patent also illustrates that the inductor, such as 9 herein, may be arranged inside of the field-pole member, this constituting a mere inversion.

In Fig. 4 is shown another form of the invention similar to that in Fig. 3, except that the control contacts are respectively placed in series with respective pairs of loop-connected coils. The resistances 53 and 55 are also eliminated. In this figure, like numerals designate like parts with respect to the description of Figs. 2 and 3. The individual contacts shown at 59, 61, 63 and 65 are sequence operated, each being by-passed by a condenser 67, 69, 71 and 73, respectively. Since each contact-condenser combination is on a stationary part of the machine, additional slip rings 75, 77, 79 and 81, with brushes 83, 85, 87 and 89, respectively, are required. This allows convenient control of the contacts 59, 61, 63 and 65, as in the case of contacts A, B, C and D in Figs. 2 and 3.

The advantages of the invention will now be clear and are as follows, but not necessarily in order of importance.

(1) Each protective resistance which is parallel-connected with an exciter coil, being wound in the same direction as the coil and as a toroid, provides additional magnetomotive force for the magnetic field F.

(2) The position of the toroid constituting the resistance on the outside of the exciter coil favors heat dissipation.

(3) The positioning of the resistor coil on the rotary part carrying the rotary exciter coil means that the reduction in inverse voltage is carried out in a part of the circuit which does not include the contacts between the slip rings and brushes. This is an improvement over a case wherein the resistance might be placed upon a stationary part of the machine such as 39. In such case, opening of the circuit at the brushes would disconnect the resistance and there would then be no protection against a high inverse voltage. Such a high inverse voltage might then cause breakdown, either of the insulation of the exciter coil such as 23, or of the leads 43 and 45. Because such an accidental circuit interruption might occur at any time, it is important that the resistance be permanently connected to the field coil.

(4) By making each resistance unit toroidal around the axis of rotation, the unit is inherently dynamically balanced, which would not be the case if the resistance units were placed on the rotary field member in forms other than toroidal with respect to the axis. Thus the structure is simplified, requiring no counterbalancing weights nor any complicated design to avoid injury to the resistance units under centrifugal force.

(5) While Fig. 1 shows air-cooled apparatus, some apparatus of this type is water-cooled. If non-toroidal resistance units were mounted on the rotating field, their protection against the coolant would be difficult, because the strong enclosures required would increase heat-dissipation problems. It is very simple to protect a toroidally wound resistance in a waterproof container such as 29 outside of the coil 23, and such a container has an inherently great heat-dissipating surface.

It will be obvious that other multiples of the coils may be used. Also, without changing the circuit relationships, each resistance coil 27 can be wound sidewise with respect to its series loop-connected coil 23, or if it is desired to forego the advantage of an essentially integral toroid composed of the coils 23 and 27 (as shown in Fig. 1) these could be wound as individual toroids and supported separately on the rotary member.

It will be seen that in a broad sense the functions of each resistance such as 27, 127, 227, 327 or 427 is to provide a differential impedance, by which is meant that relatively to the field energizvoltage supplied by the network as a whole, the impedance of the resistance element 27 is high; but relatively to the inverse voltages of a coil 23, 123, 223, 323, 423 its impedance is low. Stated otherwise, so far as is concerned the voltage in the network as a whole, the impedance in a resistance such as 27 is relatively high. But so far as is concerned the series loop circuit formed by a resistance such as 27 and a coil such as 23, the impedance of resistance 27 is relatively low. It will therefore be clear that other equivalent differential impedance elements may be used to provide such differential impedance instead of a resistance. For example, there may be substituted for the impedance 27 in parallel across the coil 23 an electric valve element such as a selenium rectifier, which will resist free flow of current in one direction from the voltage source 47 but will permit current flow in the opposite direction, as upon discharge of the field coil such as 23. Such an arrangement is shown in Fig. 5, which shows the elements of the circuit on the rotor side of the slip rings 31 and 33. The arrows represent current flow. In this figure the remainder of the circuit may be considered to be the same as the remainder of the circuit in Fig. 2. In this Fig. 5, like numerals designate like parts, the selenium rectifier 91 being substituted for a resistance. The advantages of items 2 and 3 abovementioned are obtained, plus the further advantages of greater efficiency and current smoothing in the event the power source is pulsating.

It will be understood that certain phases of the invention have advantages independently of whether or not the dynamoelectric machine requires slip rings and brushes to bring exciting current to the field coil. For example, it is advantageous in the case of an annular field coil in the swinging but nonrotary carcass of a dynamometer to have a by-passing resistance wound integrally with it, i. e., to have the series loop circuit formed by field coil and resistance coil components formed in one annular coil. For an example of a machine wherein this construction would be useful without slip rings and brushes see said Patent 2,367,636.

The term dynamoelectric machine as used herein comprehends electromagnetic machines incorporating field coils, and includes (without limitation) slip couplings, clutches, brakes, dynamometers, motors and generators.

In view of the above, it will be seen that the several objects of the invention are achieved and other advantages results attained.

As many changes could be made in the above constructions without departing from the scope of the invention, it is intended that all matter contained in the above description or shown in the accompanying drawings shall be interpreted as illustrative and not in a limiting sense.

I claim:

1. In a dynamoelectric machine having a field member constituted by a sleeve on which are carried axially spaced pole rings having axially directed interdigitated pole-forming teeth spaced from the sleeve to provide an annular space, a toroidal coil located in said annular space which coil is constituted by a relative large low-resistance inductive coil element adjacent the sleeve and a relatively small high-resistance inductance coil element adjacent the teeth, said coil elements being permanently connected in parallel.

2. A dynamoelectric machine having a rotary field member carrying an annularly wound inductive field coil served through slip rings engaged by stationary brushes, an annularly wound resistance carried on the rotary field member and connected in parallel with said field coil, the winding of the resistance being in the same direction as the winding of the field coil so as to augment its inductance, said resistance also forming with the field coil a series loop circuit all of which is carried on and movable with the field member, the total value of the resistance being several times the total value of the resistance of the field coil.

3. Apparatus made according to claim 2, wherein both the field coil and the resistance are wound as an integral toroidal coil member about the axis of rotation of the field member, the windings of the resistance constituting the external portion of said toroidal member.

4. A dynamoelectric machine having a rotary field member carrying a plurality of movable field coils served through slip rings engaged by stationary brushes; the field coils being connected in parallel, and inductive resistance windings carried on the rotary field member, said resistance windings being also in parallel connection across said network, each resistance winding forming with a field coil a series loop circuit which is carried on and movable with the field member.

5. Apparatus made according to claim 4, wherein all of the current of the network is supplied to the field coils and resistance windings through two slip rings.

6. Apparatus made according to claim 4, wherein one slip ring is connected to one end of each field coil, and wherein the other ends of the field coils are connected to other individual slip rings respectively.

7. Apparatus made according to claim 6, further including a D. C. power source and sequentially operated control switches for sequentially energizing and deenergizing the field coils.

8. In a dynamoelectric machine having a rotary field member constituted by a sleeve on which are carried axially spaced pole rings having axially directed interdigitated pole-forming teeth to provide an annular space; a toroidal coil located in said annular space and constituted by a relatively low-resistance inductive coil element adjacent the sleeve and a relatively high-resistance inductive coil element adjacent the teeth, slip rings carried by the field member, said coil elements being connected in parallel across said slip rings and between themselves forming a series loop circuit carried bodily on the rotary field member.

9. In a dynamoelectric machine having relatively rotary members one of which constitutes a field member, an annular coil-receiving chamber formed within said field member, two parallel-connected inductive windings located within said chamber, said windings forming a common toroid and having a common magnetic circuit, and one of said windings having a small number of turns and a large resistance relative to said other winding.

10. Apparatus made according to claim 9 wherein said two windings are wound in the same direction relative to their connections so that their respective magnetomotive forces are additive.

11. In a dynamoelectric machine having a rotary field member adapted to carry a field coil served through slip rings engaged by stationary brushes, an annular coil-receiving recess formed within said field member to be concentric with the rotational axis, and two inductive windings located within said recess, said windings forming a common toroid and having a common magnetic circuit, one of said windings having a small number of turns and large resistance relative to said other winding, and both of said windings being permanently connected in parallel to form a loop circuit bodily carried on and movable with the field member.

12. Apparatus made according to claim 11 wherein the high-resistance winding is located outwardly of the other winding in said coil-receiving recess.

RALPH L. JAESCHKE.

REFERENCES CITED

The following references are of record in the file of this patent:

UNITED STATES PATENTS

| Number | Name | Date |
|---|---|---|
| 491,695 | Wood | Feb. 14, 1893 |
| 780,547 | Wiard | Jan. 24, 1905 |
| 929,269 | Arnold | July 27, 1909 |
| 959,548 | Kettering | May 31, 1910 |
| 2,180,174 | Sills et al. | Nov. 14, 1939 |
| 2,357,517 | Burdick et al. | Sept. 5, 1944 |